May 26, 1970     H. H. JAMON     3,514,739
ELECTRICAL CONTACT ARRANGEMENT OF HIGH CURRENT CARRYING
CAPACITY FOR CABLE JOINTS
Filed Jan. 12, 1968     2 Sheets-Sheet 1

INVENTOR.
Henry Hubert Jamon
BY Michael S. Striker
Attorney

May 26, 1970  H. H. JAMON  3,514,739
ELECTRICAL CONTACT ARRANGEMENT OF HIGH CURRENT CARRYING
CAPACITY FOR CABLE JOINTS
Filed Jan. 12, 1968  2 Sheets-Sheet 2
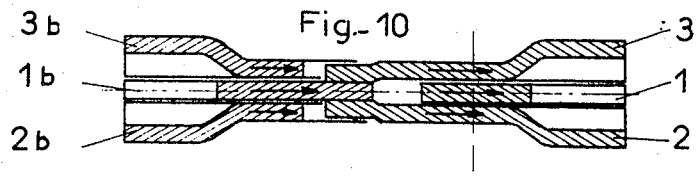
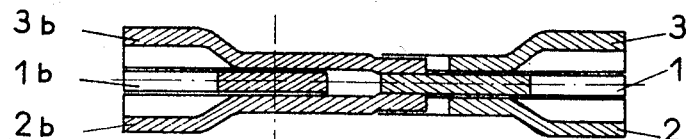
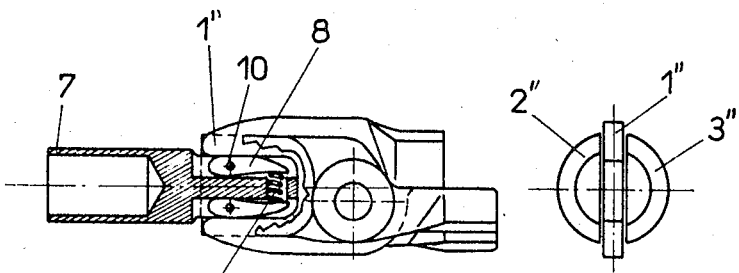
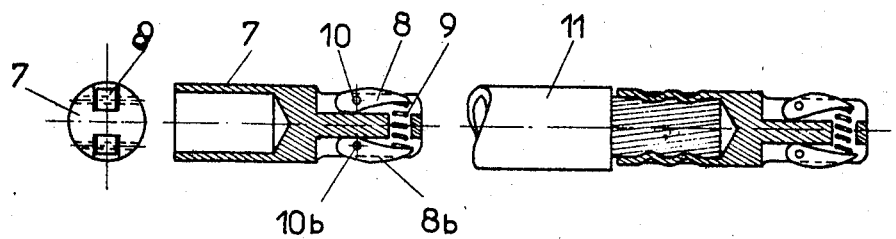
INVENTOR.
Henry Hubert Jamon
BY United States Patent Office 3,514,739
Patented May 26, 1970

3,514,739
ELECTRICAL CONTACT ARRANGEMENT OF HIGH CURRENT CARRYING CAPACITY FOR CABLE JOINTS
Henri Hubert Jamon, Soicy-sous-Montmorency, France, assignor to Etablissement Satra, Societe Achat et Transactions, Vaduz, Liechtenstein
Filed Jan. 12, 1968, Ser. No. 697,436
Claims priority, application France, Jan. 14, 1967, 536/67
Int. Cl. H01r 25/04
U.S. Cl. 339—47
8 Claims

ABSTRACT OF THE DISCLOSURE

An electrical contact arrangement of high current carrying capacity for cable joints comprising a pair of contact members interengageable with each other for releasably and conductively connecting two conductors with each other, wherein the contact members are of the identical configuration.

BACKGROUND OF THE INVENTION

It is known to connect the ends of two single pole or multi-pole cables by electrical contact arrangements to each other and such electrical contact arrangements generally comprise two conductive parts for each conductor of the cable, one male and one female, which interengage with each other according to a preset pattern, or the conductive parts are joined end to end and each of the conductive parts is held in place by a surrounding block of insulating material. The contact parts have to be arranged in such a manner that they can transmit, without being abnormally heated, a maximum electric current corresponding to the nominal current for which the conductors or cables to be connected are constructed.

The progress of the electro-technical industry and the constantly increasing requirements of this industry require contact arrangements which permit to transmit currents of ever-increasing intensity.

It is an object of the present invention to provide for a contact arrangement of the aforementioned kind which permits transmission of high currents between a pair of conductor ends arranged adjacent to each other.

It is an additional object of the present invention to provide for a contact arrangement of the aforementioned kind which is composed of few and simple parts so that the contacts of the arrangement may be manufactured at reasonable cost and will stand up perfectly during extended use.

It is a further object of the present invention to provide for a contact arrangement of the aforementioned kind in which the contacts may be easily engaged and disengaged from each other either by rectilinear or by rotational movement so that the contact arrangement may find universal application.

SUMMARY OF THE INVENTION

With these objects in view, the electrical contact arrangement according to the present invention, especially for high currents, for cable joints, mainly comprises a pair of contact members interengageable with each other, in which the pair of contact members are exactly identical.

Preferably, each contact member has four contact surfaces, respectively engaging corresponding contact surfaces of the other member when the pair of contact members are interengaged with each other, and forming with the contact surfaces of the other contact member four independent contact zones. The contact surfaces are preferably arranged in such a manner that interengagement of the pair of contact members may be carried out by rectlinear or by rotational movement of the contact members with respect to each other. The contact arrangement according to the present invention can therefore be used in connection with rectilinear engageable casing parts or in connection with casing parts which include a bayonet joint and which have therefore to be rotated through an angle with respect to each other when they are to be connected with each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 10 is a schematic cross-section taken along the line $x-x'$ of of FIG. 9;

FIG. 11 is a schematic cross-section taken along the line $y-y'$ of FIG 9;

FIG. 12 is a partially sectioned front view of a contact member as shown in FIG. 1 and a cable cap engaged in the rear end of the contact member;

FIG. 13 is an end view of the contact member shown in FIG. 12 with the cable cap removed;

FIG. 14 is an end view of the cable cap shown in FIG. 12;

FIG. 15 is a longitudinal cross-section through the cable cap; and

FIG. 16 is a partially sectioned front view and showing the cable cap of FIG. 15 and the end of a cable connected thereto.

DESCRIPTION OF THE PREFERRED EMBODIMENTS

Figure 1:
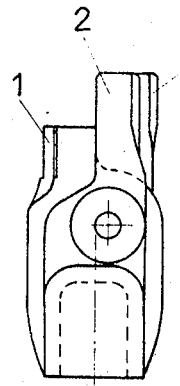
FIG. 1 is a front view of one contact member of the contact arrangement according to the present invention.
Figure 2:
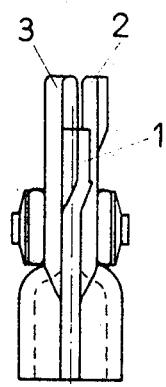
FIG. 2 is a side view of the contact member shown in FIG. 1.
Figure 3:
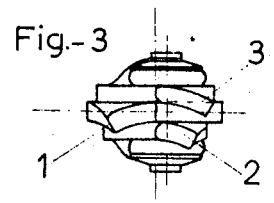
FIG. 3 is a top view of the contact member shown in FIG. 1.
Figure 4:
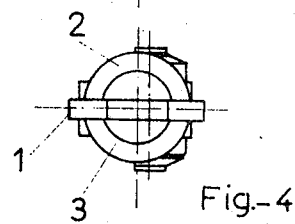
FIG. 4 is a bottom view of the contact member shown in FIG. 1.
Figure 5:
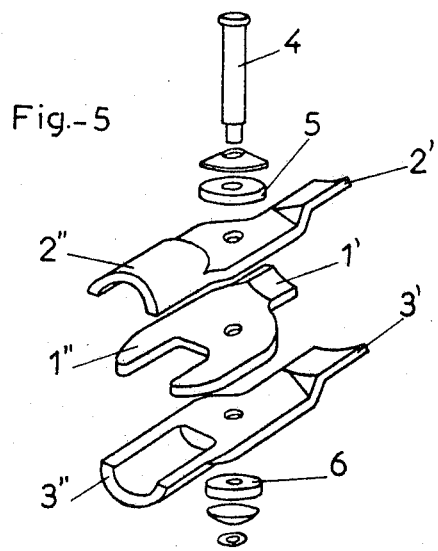
FIG. 5 is an exploded view of the contact member shown in FIG. 1.

Referring now to the drawing, and more specifically to FIGS. 1–5 of the same, it will be seen that each of the identical pair of contact members of the contact arrangement according to the present invention comprises three parts, that is, a central part 1 and a pair of outer parts 2 and 3 respectively arranged to opposite sides of the central part 1 and engaging the latter at a middle portion thereof. Means are further provided for resiliently pressing the middle portions of the three parts against each other, and these means may include a pin 4 extending transversely through correspondingly aligned openings in the three parts, and at least one or preferably two washers 5 and 6 of elastic material such as rubber, polychloroprene, etc. sandwiched between peened over heads or other end members of the pin 4 and corresponding faces of the outer contact parts 2 and 3. The three parts 1–3 of each contact member have front end portions adapted to engage with corresponding front end portions on the three parts of the other contact member, and the front end portion 1' of the central part is in form of a curved blade, whereas the front end portions 2' and 3' of the outer two parts are in the form of wings curved in the same direction as the blade 1', but the wings 2' and 3' are longer than the blade 1' and are angularly displaced with respect to the latter as best shown in FIG. 3.

Figure 6:
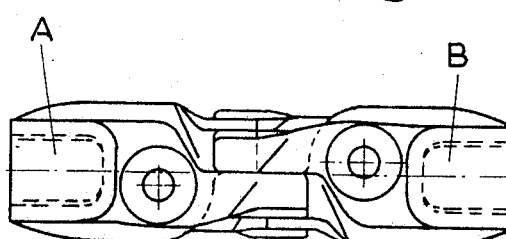
FIG. 6 is a front view showing two contact members engaged with each other.
Figure 7:
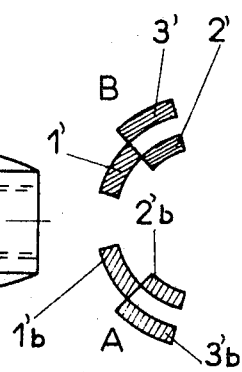
FIGS. 7–9 are schematic cross-sectional views through front portions of a pair of contact members and respectively illustrating successive steps during engagement of the front portions of the contact members with each other by rotational movement with respect to each other.
Figures 8, 9:
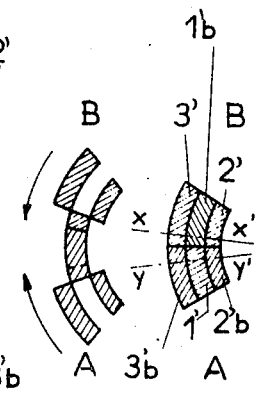

When two identical contact members A and B are interengaged with each other as shown in FIG. 6, the central blade 1'b of the contact member A is tightly inserted between the wings 2' and 3' of the contact member B, and the central blade 1' of the contact member B is tightly inserted between the two wings 2'b and 3'b of the contact member A. Each blade 1' and 1'b has two curved contact faces and the electrical contact of the assembly is assured by four distinct and independent contact zones in which the parts are pressed against each other. This feature of the contact arrangement of the present invention is clearly shown in FIGS. 10 and 11 which respectively illustrate cross-sections taken along the lines x'—x' and y'—y' of FIG. 9 and this provides in the contact assembly according to the present invention a current-carrying capacity which is four times the current-carrying capacity provided by each contact zone.

Furthermore, the four contact zones are respectively arranged parallel and aligned in the direction of the current flow. This arrangement causes a parallel flow of electric current in one direction simultaneously through all conductive contact parts of the contact arrangement (FIG. 10). In this manner, the electro-dynamic forces produced during passage of current through the contact arrangement will produce an attraction of adjacent contact parts towards each other. This feature will cause an increase of the forces which apply the contact parts 1, 2 and 3 against the contact parts 3b, 2b and 1b during an increase of the intensity of the electric current which flows through the contact arrangement.

Since the quality of an electric contact arrangement varies in the same sense as the pressure at which the contact parts of a contact arrangement are pressed against each other, the contact arrangement according to the present invention has a quality which will automatically improve during the presence of a short or extended surging of the electric current.

According to a further feature of the present invention, illustrated in FIGS. 12–16, the rear portion of each contact member (FIG. 4) opposite to its front portion (FIG. 3) destined to be coupled with the front portion of an identical contact member, may be constructed in a manner to be connected to an electrical conductor or cable 11 provided with a coupling means in form of conductive cap, connected by soldering or pressure to the free blank end of the cable. For this purpose, the rear portion of the central part 1 of each contact member is in the form of a fork-shaped blade 1" having a pair of substantially parallel branches with inner contact surfaces facing each other and adapted to make contact with the cap 7 mounted on the end of a conductor 11. The rear portions 2" and 3" of the outer contact parts 2 and 3, arranged on opposite sides of the central contact part 1, have inner substantially semi-cylindrical contact surfaces. When the conductive cap 7 is engaged between the branches of the fork-shaped blade portion 1', the semi-cylindrical contact surfaces of the rear portions 2" and 3" (FIGS. 5 and 13) will make contact with the cylindrical portions of the cap 7 and establish thereby therewith two contact zones under the influence of the elastic system previously mentioned.

The forces at which the semi-cylindrical surfaces of the rear portions 2" and 3" of the contact parts 2 and 3 are applied against the conductor cap 7 are therefore constituted by the reaction of the forces which are used to apply the front end portions of the conductive parts of one contact member against the corresponding portions of an identical contact member during engagement of the two contact members with each other.

The cylindrical front portion of the cap 7 (FIGS. 14 and 15) is further provided with two longitudinally extending and diametrically oppositely arranged slots in which two pawls 8 and 8b, pivotable about pivot pins 10 and 10b, are respectively arranged. The pawls 8 and 8b establish an electrical contact between the bottoms of the slots of the cap 7 and the parallel contact surfaces of the fork-shaped rear portion 1" of the central part 1 of the respective contact member. The pivot pins 10, 10' are arranged in bores of the pawls 8 and 8b with considerable clearance so that in the engaged position as shown in FIG. 12, the pawls 8 8b are in a position of equilibrium under the effect of three forces and out of contact with the pivot pins 10 and 10b. The three forces which act for instance on the pawl 8 (FIG. 12) are the following: acting on the bottom and the left end, as viewed in FIG. 12, on the pawl 8 is the reaction force from the bottom of the slot; acting on the bottom and at the right side, as viewed in FIG. 12, is the force of a compression spring 9 inserted between the free front ends of the pawls 8 and 8b, and on the top and substantially at the center of the pawl 8 acts the reaction force from one of the contact surfaces of the fork-shaped blade 1" on the rear portion of the central contact part 1.

The two contact zones created by the pawls 8 and 8d are added to the two contact zones established between the semi-circular contact surfaces of the rear portions 2" and 3" of the contact parts 2 and 3 and the cap 7 mentioned above.

Conduction of current between the cap 7 and the corresponding contact member is therefore likewise provided through four contact zones so that the contact arrangement of the present invention has a nominal current-carrying capacity which is equal to the sum of the current-carrying capacity provided by the last mentioned four contact zones.

The arrangement according to the present invention comprising the above-described contact member and the conductive cap connected to the free end of a cable constitutes therefore an electric contact arrangement particularly adapted to carry currents of high intensity. The arrangement further permits easy insertion and connection of a conductor or cable, requiring only the provision of a contact cap on the end of the conductor.

It will be understood that each of the elements described above, or two or more together, may also find a useful application in other types of electrical contact arrangements having a high current carrying capacity differing from the types described above.

While the invention has been illustrated and described as embodied in an electrical contact arrangement having a high current carrying capacity and comprising a pair of identical contact members interengageable with each other, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electrical contact arrangement of high current carrying capacity for cable joints, comprising, in combination, a pair of contact members interengageable with each other, in which said pair of contact members are of identical configuration, each contact member comprising three conductive parts engaging each other at portions thereof; means for resiliently pressing portions of said three parts against each other, said portions of said three parts being formed with aligned openings, said resilient pressing means comprising a transverse pin extending through said opening and elastic means at at least one end of said pin and resiliently pressed against the part adjacent thereto.

2. An electrical contact arrangement of high current carrying capacity for cable joints, comprising, in combination, a pair of contact members interengageable with each other, in which said pair of contact members are of identical configuration, each of said contact members having front end portions interengageable with front end portions of the other of said pair of contact members, and a rear end portion, said rear end portion being formed for receiving coupling means on a conductor for quick connection of the conductor to the contact member, said rear end portion of each contact member having four contact surfaces respectively adapted to engage with contact surfaces of said releasable coupling means fixed to the end of said conductor.

3. An electrical contact arrangement of high current carrying capacity for cable joints, comprising, in combination, a pair of contact members interengageable with each other, in which said pair of contact members are of identical configuration, each of said contact members comprising a central part and two outer parts respectively abutting with portions thereof against opposite sides of a middle portion of said central part, said parts having respectively front end portions curved in the same direction, the front end portions of said outer parts being longer than that of said central part, and the front end portion of said central part being angularly displaced with respect to the front end portions of said outer parts.

4. An electrical contact arrangement of high current carrying capacity for cable joints, comprising, in combination, a pair of contact members interengageable with each other, in which said pair of contact members are of identical configuration, each of said contact members comprising a central part and two outer parts respectively abutting with portions thereof against opposite sides of a middle portion of said central part, said parts having respectively front end portions curved in the same direction, the front end portions of said outer parts being longer than that of said central part, and the front end portion of said central part being angularly displaced with respect to the front end portions of said outer parts, each of said parts having a rear end portion, the rear end portions of said outer parts having inner substantially semi-cylindrical contact surfaces and the rear end portion of said central part being fork-shaped and having a pair of substantially parallel contact surfaces facing each other.

5. An electrical contact arrangement of high current carrying capacity for cable joints, comprising, in combination, a pair of contact members interengageable with each other, in which said pair of contact members are of identical configuration, each of said contact members comprising a central part and two outer parts respectively abutting with portions thereof against opposite sides of a middle portion of said central part, said parts having respectively front end portions curved in the same direction, the front end portions of said outer parts being longer than that of said central part, and the front end portion of said central part being angularly displaced with respect to the front end portions of said outer parts, each of said parts having a rear end portion, the rear end portions of said outer parts having inner substantially semi-cylindrical contact surfaces and the rear end portion of said central part being fork-shaped and having a pair of substantially parallel contact surfaces facing each other, and coupling means of conductive material fastened to a conductor for releasably connecting the conductor to a respective contact member, said coupling means having four contact faces respectively adapted to engage said semi-cylindrical and said parallel contact surfaces of said rear end portions of said contact member.

6. An electrical contact arrangement of high current carrying capacity for cable joints, comprising, in combination, a pair of contact members interengageable with each other, in which said pair of contact members are of identical configuration, each of said contact members comprising a central part and two outer parts respectively abutting with portions thereof against opposite sides of a middle portion of said central part, said parts having respectively front end portions curved in the same direction, the front end portions of said outer parts being longer than that of said central part, and the front end portion of said central part being angularly displaced with respect to the front end portions of said outer parts, each of said parts having a rear end portion, the rear end portions of said outer parts having inner substantially semi-cylindrical contact surfaces and the rear end portion of said central part being fork-shaped and having a pair of substantially parallel contact surfaces facing each other, and coupling means of conductive material fastened to a conductor for releasably connecting the conductor to a respective contact member, said coupling means having four contact faces respectively adapted to engage said semi-cylindrical and said parallel contact surfaces of said rear end portions of said contact member, said coupling means comprising a substantially cylindrical coupling member formed with a pair of longitudinally extending diametrically oppositely arranged slots, and a pair of spring-pressed pawls respectively pivotally arranged in said slots for engagement with said substantially parallel contact surfaces of said fork-shaped rear end portions of said central part of said contact member.

7. An electrical contact arrangement of high current carrying capacity for cable joints, comprising, in combination, a pair of contact members interengageable with each other, in which said pair of contact members are of identical configuration, each contact member having four contact surfaces engaging corresponding contact surfaces of the other contact member when said pair of contact members are interengaged with each other and forming with the contact surface of the other contact member four independent contact zones, said contact surfaces being parts of cylindrical surfaces and arranged so that interengagement of said pair of contact members may be carried out by either rectilinear or by rotational movement, said rectilinear or rotational movement bringing said contact surfaces into substantially full electrical contact whereby electrical current flow through said contact arrangement is substantially distributed over said contact surfaces.

8. An electrical contact arrangement of high current carrying capacity for cable joints, comprising, in combination, a pair of contact members interengageable with each other, in which said pair of contact members are of identical configuration, each contact member having four abutting similarly curved surfaces, two of said abutting surfaces forming the interior surfaces of two side contact positions adjacent a centrally lying contact portion and the other two of said abutting surfaces forming the exterior surfaces of said centrally lying contact portion, said four abutting surfaces forming four separate current transfer surfaces with the corresponding other contact member.

References Cited

UNITED STATES PATENTS 2,125,816  8/1938  Reynolds _____ 339—47
2,360,304  10/1944 McLoughlin et al. __ 339—248 X
2,745,076  5/1956  Kolstad _____ 339—47

RICHARD E. MOORE, Primary Examiner

U.S. Cl. X.R.

339—248, 255